(12) United States Patent
Seo et al.

(10) Patent No.: US 12,027,715 B2
(45) Date of Patent: Jul. 2, 2024

(54) BATTERY MODULE HAVING SWELLING GAUGE, AND BATTERY PACK COMPRISING SAME

(71) Applicant: LG CHEM, LTD., Seoul (KR)

(72) Inventors: Sung-Won Seo, Daejeon (KR); Dal-Mo Kang, Daejeon (KR); Jeong-O Mun, Daejeon (KR); Yoon-Koo Lee, Daejeon (KR); Eun-Ah Ju, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 617 days.

(21) Appl. No.: 17/281,140

(22) PCT Filed: Dec. 20, 2019

(86) PCT No.: PCT/KR2019/018235
§ 371 (c)(1),
(2) Date: Mar. 29, 2021

(87) PCT Pub. No.: WO2020/145549
PCT Pub. Date: Jul. 16, 2020

(65) Prior Publication Data
US 2021/0344057 A1 Nov. 4, 2021

(30) Foreign Application Priority Data
Jan. 8, 2019 (KR) .................. 10-2019-0002470

(51) Int. Cl.
*H01M 50/209* (2021.01)
*H01M 10/04* (2006.01)
(Continued)

(52) U.S. Cl.
CPC ..... *H01M 50/209* (2021.01); *H01M 10/0481* (2013.01); *H01M 10/48* (2013.01);
(Continued)

(58) Field of Classification Search
CPC ............ H01M 50/209; H01M 50/242; H01M 50/211; H01M 50/238; H01M 10/0481; H01M 10/48; H01M 10/488
See application file for complete search history.

(56) References Cited

U.S. PATENT DOCUMENTS 2,812,376 A   11/1957  Yardney
6,143,440 A * 11/2000  Volz ................... H01M 50/578
                                                   429/61
(Continued)

FOREIGN PATENT DOCUMENTS

EP     3 190 642 A1   7/2017
JP     S56-9972 A     1/1981
(Continued)

OTHER PUBLICATIONS

Extended European Search Report for European Application No. 19908315.5, dated Jan. 18, 2022.
(Continued)

*Primary Examiner* — Matthew J Merkling
(74) *Attorney, Agent, or Firm* — Birch, Stewart, Kolasch & Birch, LLP (57) ABSTRACT

A battery module allows a swelling amount of battery cells accommodated in a module housing to be intuitionally checked. The battery module includes a cell pressing plate accommodated in the module housing and disposed on at least one of both longitudinal side surfaces of a cell stack that is formed by stacking the battery cells; and a swelling gauge provided to protrude from a surface of the cell pressing plate. When the battery cells swell, the swelling gauge is pushed out of the module housing through a gauge hole formed in the module housing so that a swelling amount of the battery cells may be checked.

10 Claims, 5 Drawing Sheets

(51) Int. Cl.
  *H01M 10/48* (2006.01)
  *H01M 50/211* (2021.01)
  *H01M 50/238* (2021.01)
  *H01M 50/242* (2021.01)
  *H01M 50/271* (2021.01)

(52) U.S. Cl.
  CPC ....... *H01M 10/488* (2013.01); *H01M 50/211* (2021.01); *H01M 50/238* (2021.01); *H01M 50/242* (2021.01); *H01M 50/271* (2021.01)

(56) References Cited

U.S. PATENT DOCUMENTS

| | | | | |
|---|---|---|---|---|
| 6,296,965 | B1* | 10/2001 | Azema | H01M 50/578 |
| | | | | 429/57 |
| 2002/0098410 | A1* | 7/2002 | Leysieffer | H04R 25/305 |
| | | | | 429/61 |
| 2005/0077878 | A1* | 4/2005 | Carrier | H01M 50/583 |
| | | | | 320/134 |
| 2008/0118824 | A1 | 5/2008 | Oguma et al. | |
| 2008/0145747 | A1* | 6/2008 | Wu | H01M 50/3425 |
| | | | | 429/56 |
| 2012/0052359 | A1 | 3/2012 | Yoshitake et al. | |
| 2014/0042961 | A1* | 2/2014 | Lan | H02J 7/00719 |
| | | | | 429/61 |
| 2015/0140390 | A1 | 5/2015 | Choi | |
| 2015/0188198 | A1* | 7/2015 | Bonhomme | B60L 58/16 |
| | | | | 429/61 |
| 2015/0380778 | A1 | 12/2015 | Kim et al. | |
| 2016/0028050 | A1* | 1/2016 | Shiraishi | H01M 50/211 |
| | | | | 429/57 |
| 2016/0308242 | A1 | 10/2016 | Ju et al. | |
| 2018/0175343 | A1 | 6/2018 | Choi et al. | |
| 2018/0337376 | A1 | 11/2018 | Jin et al. | |
| 2021/0296712 | A1* | 9/2021 | Kim | H01M 10/425 |

FOREIGN PATENT DOCUMENTS

| | | |
|---|---|---|
| JP | 2008-153203 A | 7/2008 |
| JP | 2011-90873 A | 5/2011 |
| JP | 2015-153696 A | 8/2015 |
| JP | 2015-167169 A | 9/2015 |
| JP | 2017-208178 A | 11/2017 |
| KR | 10-1272915 B1 | 6/2013 |
| KR | 10-2016-0000742 A | 1/2016 |
| KR | 10-2016-0123091 A | 10/2016 |
| KR | 10-1700254 B1 | 1/2017 |
| KR | 10-2017-0112495 A | 10/2017 |
| KR | 10-2017-0135587 A | 12/2017 |
| KR | 10-2018-0099666 A | 9/2018 |
| KR | 10-2018-0125795 A | 11/2018 |
| WO | WO 2017/087807 A1 | 5/2017 |

OTHER PUBLICATIONS

International Search Report (PCT/ISA/210) issued in PCT/KR2019/018235, dated Apr. 1, 2020.

* cited by examiner

BATTERY MODULE HAVING SWELLING GAUGE, AND BATTERY PACK COMPRISING SAME

TECHNICAL FIELD

The present disclosure relates to a battery module and a battery pack including the same, and more particularly, to a battery module with a swelling gauge capable of intuitionally observing a swelling amount of battery cells and a battery pack including the same.

The present application claims priority to Korean Patent Application No. 10-2019-0002470 filed on Jan. 8, 2019 in the Republic of Korea, the disclosures of which are incorporated herein by reference.

BACKGROUND ART

A secondary battery is high applicable to various product groups and has an electric characteristic of high energy density. The secondary battery is applied to not only portable electronic devices but also electric vehicles, hybrid electric vehicles, energy storage devices, and the like, driven by electric driving sources.

A battery pack applied to an electric vehicle or the like has a structure in which a plurality of battery modules, each including a plurality of battery cells, are connected in order to obtain a high output. Each battery cell includes positive and negative electrode current collectors, a separator, an active material, an electrolyte, and the like as an electrode assembly, and the battery cell may be repeatedly charged and discharged by an electrochemical reaction between the components.

Meanwhile, when the battery cell of the battery module is repeatedly charged and discharged, a swelling phenomenon occurs at the battery cell. In consideration of the swelling phenomenon, when the battery cells are stacked in a conventional battery module, the battery cells are disposed with regular intervals, or a compression pad is disposed between the battery cells to support the battery cells during swelling.

However, if the compression pad is used in the battery module or intervals are provided between the battery cells, the energy density per unit volume decreases. In addition, if the compression pad is used between the battery cells, the manufacturing process of the battery module becomes complicated, and the manufacturing cost of the battery module is increased. Thus, there is a need for improvement.

Also, since the swelling of the battery cells is related to the safety of the battery module, it may be very important to figure out whether swelling occurs or how much the battery cell deforms if swelling has occurred.

However, in the conventional art, generally, whether the battery cells in the battery module swell is guessed just by watching the external appearance of the battery module, or a swelling amount of battery cells is indirectly inferred through structural analysis and dimension measurement of an experimental module. For this reason it is more difficult for a general user as well as a person skilled in the art to determine exactly how the battery cells inside the battery module swell. Thus, there is needed a way for anyone such as a general person as well as a person skilled in the art to easily check whether the battery cells swell and how much the battery cells swell.

DISCLOSURE

Technical Problem

The present disclosure is designed to solve the problems of the related art, and therefore the present disclosure is directed to providing a way of reducing swelling of battery cells without lowering an energy density of a battery module and a way of intuitionally figuring out a swelling amount of the battery cells easily at a place out of the battery module.

Technical Solution

In one aspect of the present disclosure, there is provided a battery module, the battery module comprising: a module housing, a gauge hole formed in the module housing, a plurality of battery cells in the module housing, a cell pressing plate accommodated in the module housing and disposed on at least one longitudinal side surface of a cell stack that is formed by stacking the plurality of battery cells; and a swelling gauge provided to protrude from a surface of the cell pressing plate, wherein when the battery cells swell, the swelling gauge is pushed out of the module housing through the gauge hole formed in the module housing.

The battery module may further comprise a buffering member interposed between the cell pressing plate and the module housing.

The buffering member may be a leaf spring.

The leaf spring may have at least one curve, and the leaf spring may have a first surface in contact with the surface of the cell pressing plate and a second surface in contact with a surface of the module housing.

The leaf spring may have a leaf hole through which the swelling gauge passes, and the leaf spring may be disposed to contact the cell pressing plate and be suspended from the swelling gauge.

The swelling gauge may be located at a center of the cell pressing plate.

The swelling gauge may include a first swelling gauge located at the center of the cell pressing plate; and a second swelling gauge at a first longitudinal edge regions of the cell pressing plate, and a third swelling gauge at a second longitudinal edge region of the cell pressing plate.

The module housing may be configured by assembling a top plate disposed at an upper portion of the cell stack, a bottom plate disposed at a lower portion of the cell stack and a pair of side plates each having the gauge hole and respectively disposed at side surfaces of the cell stack.

The top plate and the bottom plate may have bent portions prepared by bending both longitudinal corner regions thereof, the pair of side plates may have a stepped portion at which both longitudinal corner regions are stepped, and the stepped portion may be shape-matched with an inner side of the bent portion.

In another aspect of the present disclosure, there is also provided a battery pack, comprising the battery module described above.

Advantageous Effects

According to an embodiment of the present disclosure, it is possible to provide a battery module, which may reduce swelling of battery cells without lowering an energy density of a battery module and intuitionally figure out a swelling amount of the battery cells easily at a place out of the battery module.

The effect of the present disclosure is not limited to the above effect, and other effects not mentioned herein will be clearly understood by those skilled in the art from the specification and the accompanying drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
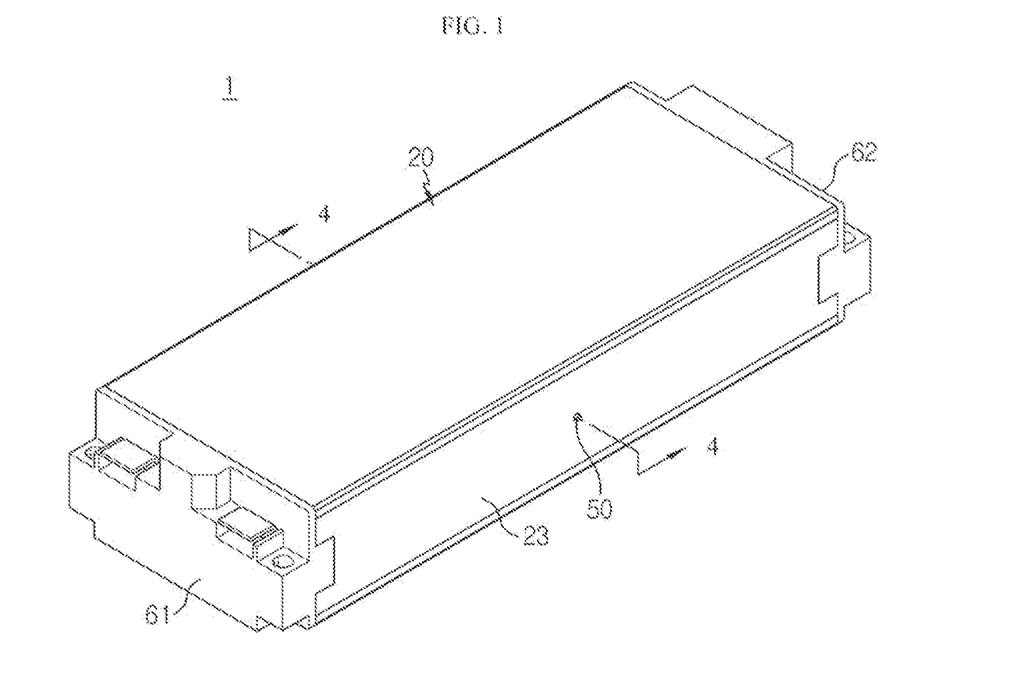
FIG. 1 is a schematic perspective view showing a battery module according to an embodiment of the present disclosure.
Figure 2:
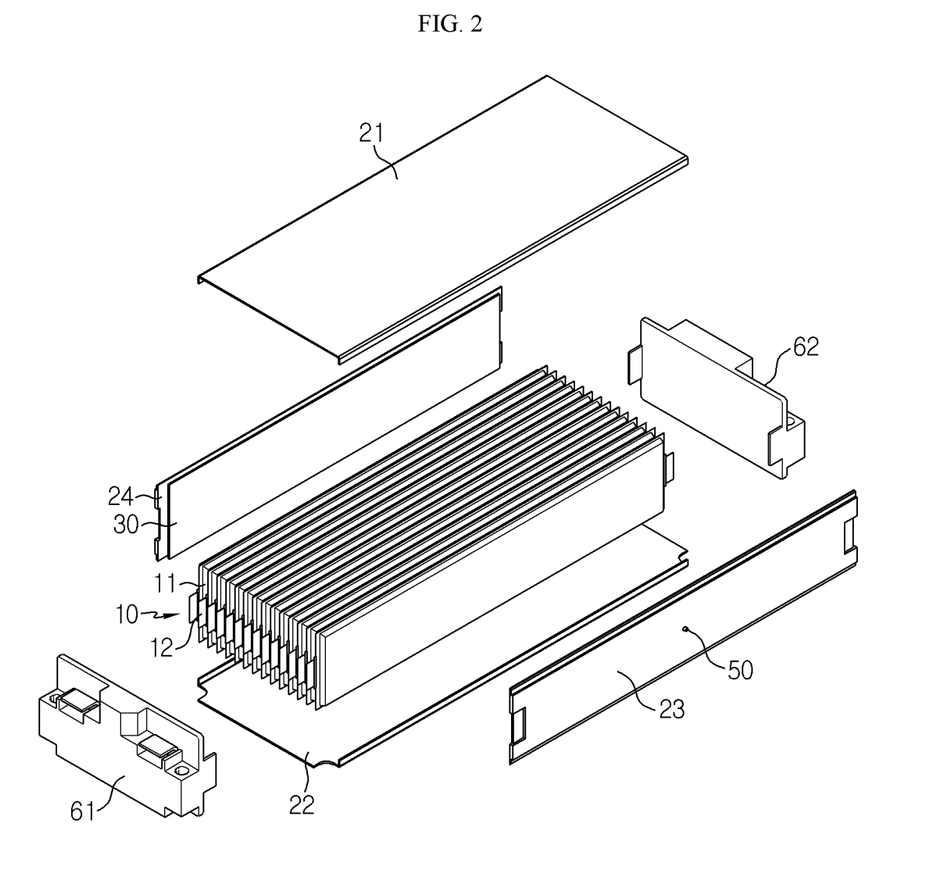
FIG. 2 is a partial exploded perspective view showing the battery module of FIG. 1.
Figure 3:
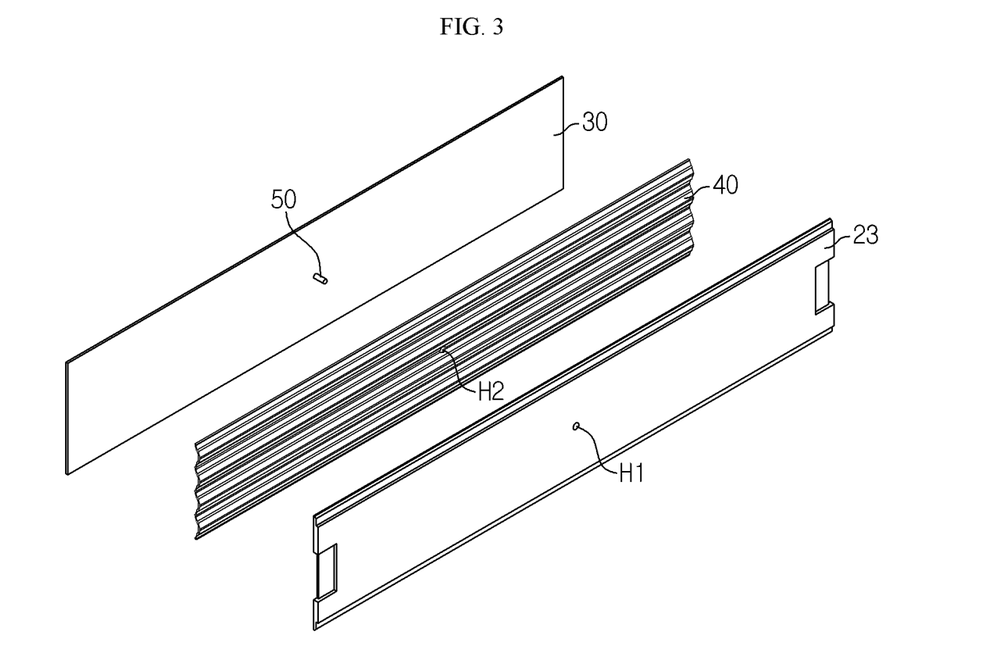
FIG. 3 is an exploded perspective view showing a cell pressing plate, a buffering member and a side plate according to an embodiment of the present disclosure.

FIG. 1 is a schematic perspective view showing a battery module according to an embodiment of the present disclosure, FIG. 2 is a partial exploded perspective view showing the battery module of FIG. 1, and FIG. 3 is an exploded perspective view showing a cell pressing plate, a buffering member and a side plate according to an embodiment of the present disclosure.

Referring to FIGS. 1 to 3, a battery module 1 according to an embodiment of the present disclosure includes a cell stack 10, a module housing 20, a cell pressing plate 30, a buffering member 40 and a swelling gauge 50.

The cell stack 10 may be an aggregate of battery cells 11, which are pouch-type battery cells 11 having broad surfaces facing each other. In other words, in this embodiment, the cell stack 10 is configured such that the pouch-type battery cells 11 are provided to stand up side by side and stacked in a horizontal direction so as to be disposed as densely as possible in the module housing 20.

The pouch-type battery cells 11 means a secondary battery including a pouch exterior and an electrode assembly provided to be accommodated in the pouch exterior. For example, the pouch exterior may include two pouches, and a concave inner space may be formed in at least one of the two pouches. In addition, the electrode assembly may be accommodated in the inner space of the pouch. Peripheries of the two pouches are welded to each other so that the inner space accommodating the electrode assembly may be sealed. An electrode lead 12 may be attached to the electrode assembly, and the electrode lead 12 may be interposed between the welded portions of the pouch exterior and exposed out of the pouch exterior to function as an electrode terminal of the battery cell.

Although not shown in detail for convenience of illustration, electrode leads 12 of the battery cells 11 may be welded to bus bars (not shown) provided on an ICB board (not shown) so that the battery cells 11 are connected in series and/or in parallel. The ICB board and the bus bars may be shielded with module covers 61, 62.

The module housing 20 has an inner space for accommodating the cell stack 10 and serves to provide a mechanical support to the stored battery cells 11 and protect the battery cells 11 from external shocks. Thus, the module housing 20 may be preferably made of a metal material to ensure rigidity. Here, the scope of the present disclosure is not limited to the module housing 20 made of metal.

As shown in FIG. 2, the module housing 20 according to an embodiment of the present disclosure includes four plates, including a top plate 21, a bottom plate 22, a left side plate 23, 24 and a right side plate 23, 24.

The top plate 21 is disposed at an upper portion of the cell stack 10, and the bottom plate 22 is disposed at a lower portion of the cell stack 10. In addition, the pair of side plates 23, 24 are disposed at left and right sides of the cell stack 10 in the longitudinal direction, respectively. The four plates are assembled together to form the module housing 20 of a rectangular tubular shape. For example, the four plates may be assembled together by snap-fitting or welding.

In particular, the module housing 20 of this embodiment has an assembled structure capable of withstanding the force applied outward from the inside of the module housing 20, in consideration of swelling of the battery cells 11.

Figure 4:
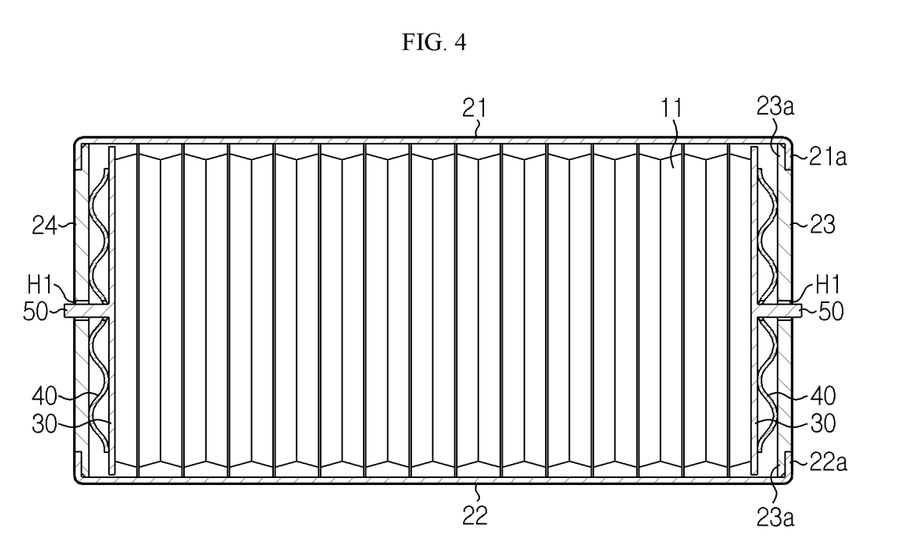
FIG. 4 is a sectioned view, taken along the line 4-4 of FIG. 1.

For this purpose, the top plate 21 and the bottom plate 22 have bent portions 21a, 22a respectively provided by bending both longitudinal corner regions thereof, and the pair of side plates 23, 24 have a stepped portion 23a at which both longitudinal corner regions are stepped (see FIG. 4).

The stepped portion 23a of the side plates 23, 24 is shape-matched with an inner side of the bent portions 21a, 22a of the top plate 21 and the bottom plate 22. In this case, when a force is applied outward from the inside of the module housing 20, the top plate 21 and the bottom plate 22 may hold the side plates 23, 24 to reduce the deformation of the side plates 23, 24.

In order to reduce the swelling of the battery cells 11 in the module housing 20, as shown in FIG. 4, the cell pressing plate 30 and the buffering member 40 are further disposed between the side plates 23, 24 and the outermost battery cell 11.

In other words, the cell pressing plate 30 is disposed to face the entire area of both longitudinal side surfaces of the cell stack 10, and the buffering member 40 is interposed between the cell pressing plate 30 and the side plates 23, 24.

The cell pressing plate 30 may be bonded to the outermost battery cell 11 in order to secure a force for close adhesion to the cell stack 10. In addition, a leaf spring 40 is employed as the buffering member 40. The leaf spring 40 has at least one curve repeatedly formed in the vertical direction and is disposed such that one surface thereof is in contact with the cell pressing plate 30 and the other surface thereof is in contact with the side plates 23, 24. As an alternative to the leaf spring 40, a compression foam or a rubber pad may also be employed.

In this embodiment, the cell pressing plate 30 and the buffering member 40 are provided in a pair, and two pairs of cell pressing plates 30 and buffering members 40 are respectively disposed at both side surfaces of the cell stack 10 to enhance a buffering capacity when the battery cells 11 swell. However, it is also possible that the cell pressing plate 30 and the buffering member 40 are disposed only at one side surface of the cell stack 10 to secure a space for additional battery cells 11 in the module housing 20 in order to increase the energy density.

According to this configuration, the cell stack 10 in the module housing 20 may be restrained in an elastically compressed state by the leaf spring 40 and the cell pressing plate 30. In this case, the compressing force of the cell pressing plate 30 and the expanding force of the battery cells 11 may be offset, thereby reducing the swelling of the battery cells 11 during charging and discharging.

Figure 5:
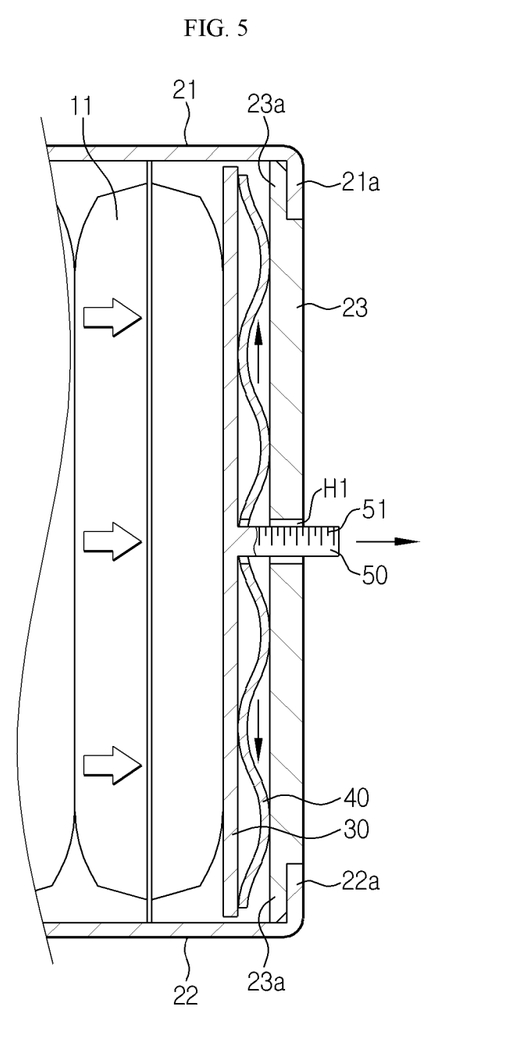
FIG. 5 is an enlarged view showing a main part when the battery cells of FIG. 4 swell.

If the expanding force of the battery cells 11 is stronger than the compressing force of the cell pressing plate 30, the leaf spring 40 of FIG. 4 deforms like the leaf spring 40 of FIG. 5. That is, the leaf spring 40 is elongated in the vertical direction as its curve or wrinkle pattern spreads. Since the leaf spring 40 is deformed as above to absorb a part of the expanding force of the battery cells 11, the external appearance of the module housing 20 may be less deformed. For reference, if even the module housing 20 is expanded, a pressure is applied not only to the corresponding battery module 1 but also to other battery module 1 or an electronic device adjacent to the corresponding battery module 1, which is not good for safety.

Meanwhile, the battery module 1 of the present disclosure further includes a swelling gauge 50 so that the degree of swelling of the battery cell 11 may be easily understood. As will be explained in detail later, the swelling gauge 50 is provided to be checked from the outside of the battery module 1 so that anyone may intuitively figure out a swelling amount of the battery cells 11. Thus, a user looking at the swelling gauge 50 may stop using the battery module 1 or replace the battery module 1 in advance by measuring the life of the battery module 1.

Hereinafter, the structure and application of the swelling gauge 50 will be described in detail with reference to FIGS. 3 to 5.

The swelling gauge 50 may be integrally formed with the cell pressing plate 30 to protrude from the surface of the cell pressing plate 30. For example, the swelling gauge 50 may have any shape whose length is measurable, such as a circular column shape, a polygonal column shape, or a steel ruler shape. In addition, the swelling gauge 50 and the cell pressing plate 30 may be manufactured separately, and then the swelling gauge 50 may be coupled to the cell pressing plate 30 by screwing or the like.

The side plates 23, 24 further have a gauge hole H1 through which the swelling gauge 50 passes. Thus, as shown in FIG. 5, when the battery cells 11 swell, the swelling gauge 50 may be pushed out of the module housing 20 through the gauge holes H1 formed in the side plates 23, 24.

At this time, the swelling amount of the battery cells 11 may be figured out by measuring the length of a front end of the swelling gauge 50 protruding out of the module housing 20 based on the gauge hole H1. A scale 51 may be displayed on the swelling gauge 50 so that the information about the swelling amount may be figured out more easily.

In particular, the swelling gauge 50 of this embodiment is located at the center of the cell pressing plate 30. This location is selected in consideration of the fact that the center of the battery cell 11 becomes most convex when being inflated. In other words, the center of the cell pressing plate 30 is most affected by the expansion of the battery cells 11, so that the swelling amount of the battery cells 11 may be measured most accurately by disposing the swelling gauge 50 at the center of the cell pressing plate 30.

Meanwhile, the leaf spring 40 also has a leaf hole H2 at the center thereof such that the swelling gauge 50 passes therethrough. By doing so, when the battery cells 11 swell, it is possible to avoid the collision of the swelling gauge 50 and the leaf spring 40. Moreover, the leaf spring 40 may be suspended from the swelling gauge 50 so that the centers of the cell pressing plate 30 and the leaf spring 40 may be conveniently disposed to contact each other.

More specifically, in order to avoid the collision between the swelling gauge 50 and the leaf spring 40, for example, it is also possible that two or more leaf springs 40 are disposed to be separated from each other at left and right sides of the swelling gauge 50. However, it is most effective to use one leaf spring 40 and one leaf hole H2 for the following reasons.

The leaf spring 40 is provided to be smaller than the width (in the Z-axis direction) of the cell pressing plate 30 and the side plates 23, 24 in consideration of deformation when the battery cell 11 swell. For this reason, in order to match the centers of the leaf spring 40 and the cell pressing plate 30, the leaf spring 40 should be spaced apart from the bottom plate 22 by a predetermined height. However, this problem may solved simply by perforating the leaf hole in the leaf spring 40 and then disposing the leaf spring 40 to be suspended from the swelling gauge 50 as in this embodiment. In addition, using one large leaf spring 40 is more effective since the expanding force of battery cells 11 may be absorbed evenly and the leaf spring 40 may be installed more easily.

Next, it will be briefly described how to use the swelling gauge 50.

First, whether the battery cells 11 inside the battery module 1 are in a swelling state may be simply figured out by seeing whether the front end of the swelling gauge 50 protrudes from the side plates 23, 24 of the module housing 20.

Further, if it is required to know the swelling amount of the battery cells 11 more accurately, the accurate swelling amount may be checked from the scale of the swelling gauge 50. That is, the length of the front end of the swelling gauge 50 protruding out of the gauge hole H1 of the side plates 23, 24 means the swelling amount of the battery cells 11. For example, if a specific point on the scale of the swelling gauge 50 is marked in red, when the specific point is outside the gauge hole H1, it may be determined as a dangerous situation and the user may take necessary measures in advance.

Figure 6:
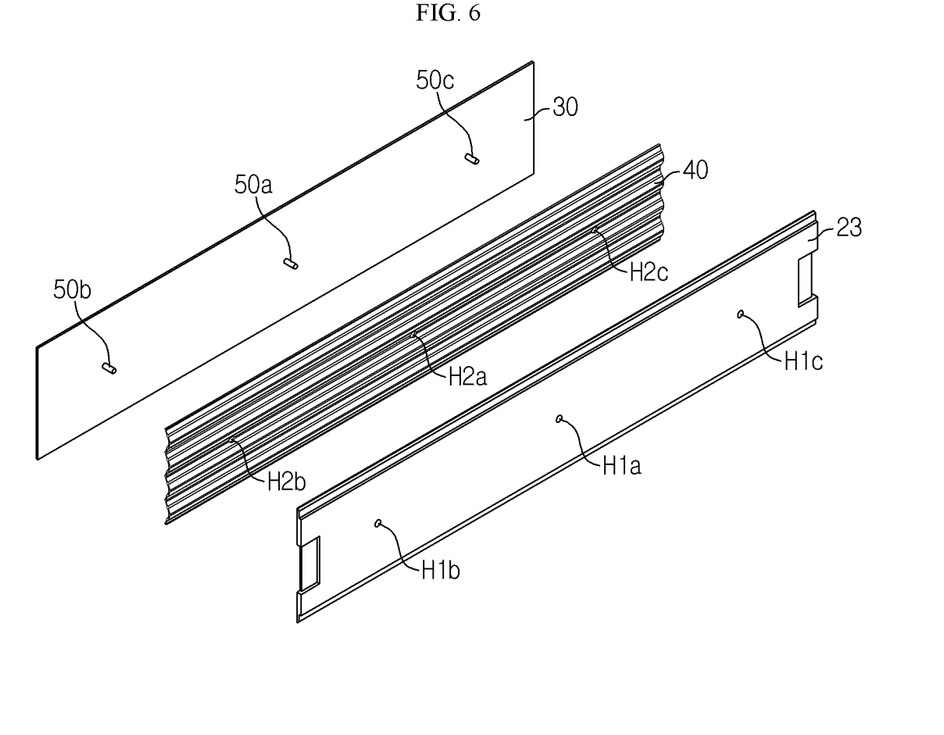
FIG. 6 is an exploded perspective view showing a cell pressing plate, a buffering member and a side plate according to another embodiment of the present disclosure.

FIG. 6 is an exploded perspective view showing the cell pressing plate 30, the buffering member 40 and the side plate 23 according to another embodiment of the present disclosure.

Next, the installation structure of swelling gauges 50a, 50c of the battery module 1 according to another embodiment of the present disclosure will be described with reference to FIG. 6. The same reference sign as in the former embodiment represents the same component, and the same component will be described in detail again. The following description will be focused on features different from the former embodiment.

Although one swelling gauge 50 is provided at the center of the cell pressing plate 30 in the former embodiment, in this embodiment, a plurality of swelling gauges 50a to 50c are provided. Namely, as shown in FIG. 6, the swelling gauges 50a to 50c include a first swelling gauge 50a located at the center of the cell pressing plate 30, and a second swelling gauge 50b and a third swelling gauge 50c provided at both longitudinal edge regions of the cell pressing plate 30.

In addition, the side plate 23 has three gauge holes H1a to H1c and the leaf spring 40 has three leaf holes H2a to H2c, corresponding to the three swelling gauges 50a to 50c.

In the former embodiment, the swelling amount may be measured only at the center of the cell pressing plate 30 where the battery cells 11 swell most severely. However, in this embodiment, the swelling amount may be further measured at both edge regions of the battery cells 11. In addition, it may be possible to determine how much the battery cells 11 swell in each region.

Also, the leaf spring 40 may be to the cell pressing plate 30 more securely. Since the leaf spring 40 may be suspended from three swelling gauges 50a to 50c, it is possible to prevent the leaf spring 40 from rotating left or right relative to the first swelling gauge 50a at the center.

As described above, since the battery module 1 according to an embodiment of the present disclosure includes the swelling gauge 50, anyone may easily check the swelling state of the battery cells 11 and take necessary measures. This may be a great help for the safe use of the battery module 1.

Meanwhile, a battery pack (not shown) according to an embodiment of the present disclosure includes at least one battery module 1 as described above. In addition to the battery module 1, the battery pack may further include a case (not shown) for accommodating the battery module 1 and various devices (not shown) for controlling the charging and discharging of the battery module 1 such as a battery management system (BMS), a current sensor and a fuse.

The battery module 1 or the battery pack may also be applied to a vehicle such as an electric vehicle and a hybrid electric vehicle, an energy storage system (ESS), or other electric devices using a secondary battery as an energy source.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery module, the battery module comprising:
a module housing;
a gauge hole formed in the module housing;
a plurality of battery cells in the module housing;
a cell pressing plate accommodated in the module housing and disposed on at least one longitudinal side surface of a cell stack that is formed by stacking the plurality of battery cells; and
a swelling gauge provided to protrude from a surface of the cell pressing plate,
wherein when the battery cells swell, the swelling gauge is pushed out of the module housing through the gauge hole formed in the module housing, and
wherein the swelling gauge has a scale indicating an amount the swelling gauge extends outside the module housing.

2. The battery module according to claim 1, further comprising:
a buffering member interposed between the cell pressing plate and the module housing.

3. The battery module according to claim 2, wherein the buffering member is a leaf spring.

4. The battery module according to claim 3, wherein the leaf spring has at least one curve, and the leaf spring has a first surface in contact with the surface of the cell pressing plate and a second surface in contact with a surface of the module housing.

5. The battery module according to claim 3, wherein the leaf spring has a leaf hole through which the swelling gauge passes, and
wherein the leaf spring is disposed to contact the cell pressing plate and be suspended from the swelling gauge.

6. The battery module according to claim 1, wherein the swelling gauge is located at a center of the cell pressing plate.

7. A battery module, the battery module comprising:
a module housing;
a gauge hole formed in the module housing;
a plurality of battery cells in the module housing;
a cell pressing plate accommodated in the module housing and disposed on at least one longitudinal side surface of a cell stack that is formed by stacking the plurality of battery cells; and
a swelling gauge provided to protrude from a surface of the cell pressing plate,
wherein when the battery cells swell, the swelling gauge is pushed out of the module housing through the gauge hole formed in the module housing,
wherein the swelling gauge includes:
a first swelling gauge located at the center of the cell pressing plate; and
a second swelling gauge at a first longitudinal edge regions of the cell pressing plate, and
a third swelling gauge at a second longitudinal edge region of the cell pressing plate.

8. A battery module, the battery module comprising:
a module housing;
a gauge hole formed in the module housing;
a plurality of battery cells in the module housing;
a cell pressing plate accommodated in the module housing and disposed on at least one longitudinal side surface of a cell stack that is formed by stacking the plurality of battery cells; and
a swelling gauge provided to protrude from a surface of the cell pressing plate,
wherein when the battery cells swell, the swelling gauge is pushed out of the module housing through the gauge hole formed in the module housing,
wherein the module housing is configured by assembling a top plate disposed at an upper portion of the cell stack, a bottom plate disposed at a lower portion of the cell stack and a pair of side plates each having the gauge hole and respectively disposed at side surfaces of the cell stack.

9. The battery module according to claim 8, wherein the top plate and the bottom plate have bent portions prepared by bending both longitudinal corner regions thereof, and the pair of side plates have a stepped portion at which both longitudinal corner regions are stepped, and
wherein the stepped portion is shape-matched with an inner side of the bent portion.

10. A battery pack, comprising the battery module according to claim 1.

* * * * *